March 21, 1967  H. E. LOWE, JR  3,310,031
SANITARY CAT BOX

Filed June 28, 1965  4 Sheets-Sheet 1

INVENTOR.
HENRY E. LOWE, JR.
BY M. A. Hobbs
ATTORNEY

INVENTOR.
HENRY E. LOWE, JR.
BY M. A. Hobbs
ATTORNEY

March 21, 1967  H. E. LOWE, JR  3,310,031
SANITARY CAT BOX

Filed June 28, 1965  4 Sheets-Sheet 3

INVENTOR.
HENRY E. LOWE, JR.
BY *M. A. Hobbs*
ATTORNEY

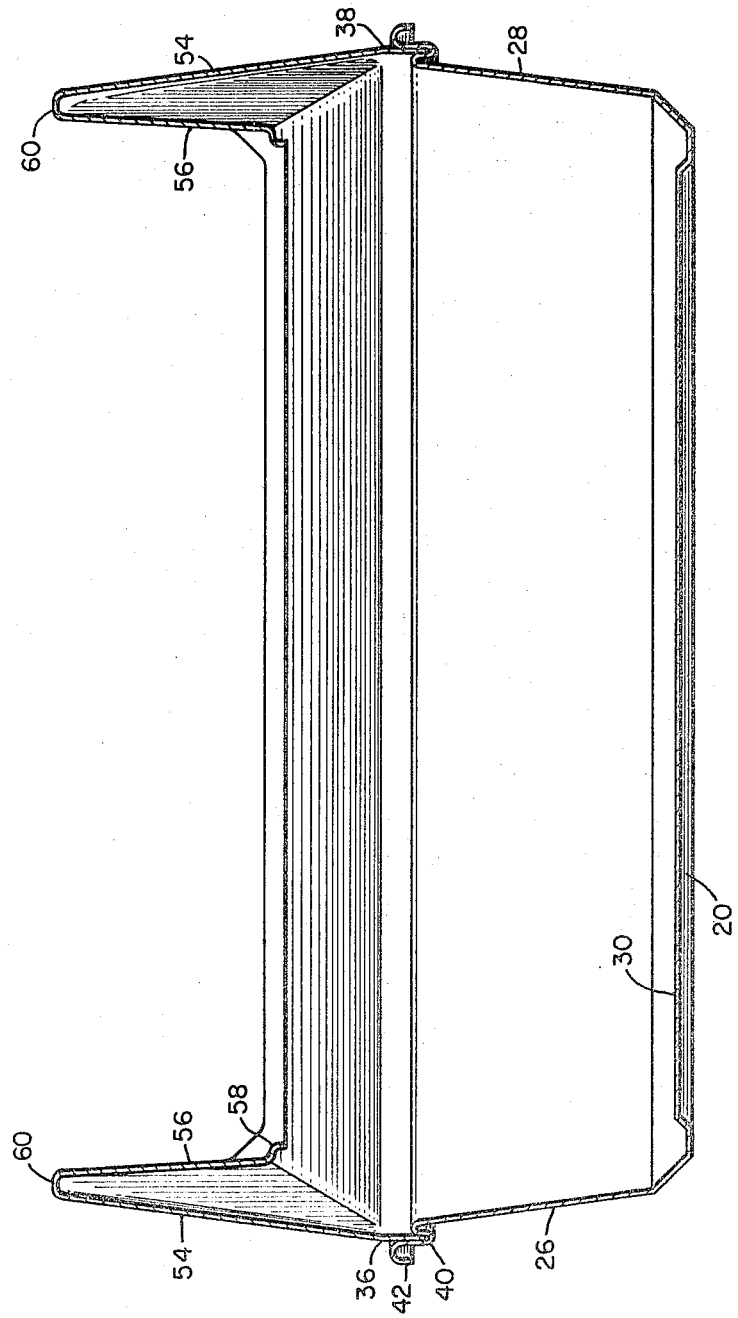

United States Patent Office 3,310,031
Patented Mar. 21, 1967

3,310,031
SANITARY CAT BOX
Henry E. Lowe, Jr., Cassopolis, Mich. 49031
Filed June 28, 1965, Ser. No. 467,408
2 Claims. (Cl. 119—1)

The present invention relates to a cat box and more particularly to a box or container for material for use by a cat in burying his normal daily waste.

Cats are often kept in apartments and homes without having the opportunity of going outdoors for their normal daily care. To overcome this difficulty, the owner usually provides a box or pan containing a filler, such as sand, sawdust or a loose material prepared specifically for this purpose, which functions as a deodorant and an absorbent. A plain box or pan is normally unsatisfactory for this purpose, since the cat usually scratches and digs in the filler material both before and after he has used the box, and consequently throws and scatters the filler material over the sides of the box onto the floor. Further, the cat in using the box, occasionally places himself in such a position near the sides of the box that the waste is not discharged or lodged in the filler material or even in the box, thus making it impossible for the cat to cover the waste in the normal manner. It is therefore one of the principal objects of the present invention to provide a sanitary box or other container for use by the cat in his normal daily care, which permits the cat to dig and scratch the material before and after using the box without scattering or throwing the material from the box, and which is so constructed and designed that the cat will inherently place himself in position in the box where the waste will be discharged onto or within the filler material and away from the sides or ends of the box.

Another object of the present invention is to provide a relatively small, easily cleaned sanitary box of the aforesaid type which can easily be disassembled for effective emptying and cleaning, and which effectively retains the filler material and waste in the box and yet is relatively small, compact and easily handled, packaged and stored.

Still another object of the invention is to provide a cat box which permits the cat to enter and leave easily without scattering the filler material, and to position himself naturally in the box in a position which assures discharging of the waste within the confines of the box.

A further object is to provide a sanitary cat box which effectively obtains the foregoing advantages and yet is simple in construction and design and attractive in appearance, and which can be constructed from a variety of materials capable of being easily cleaned and maintained in sanitary condition over extended periods of use.

Another object of the invention is to provide a structure, in combination with a box or container for material for use by a cat in burying its normal daily waste, which orients the cat automatically to a position that the waste is discharged onto the filler material in spaced relation to the sides of the box or container, without placing the cat in a cramped or other unnatural position, and without interfering with the habitual and normal digging and scratching to form a hole for the waste and to cover the waste before leaving the box or container.

Additional objects and advantages of the invention will become apparent from the following description and accompanying drawings, wherein:

FIGURE 7 is a vertical cross sectional view of the box, the section being taken on line 7—7 of FIGURE 3.

Figure 1:
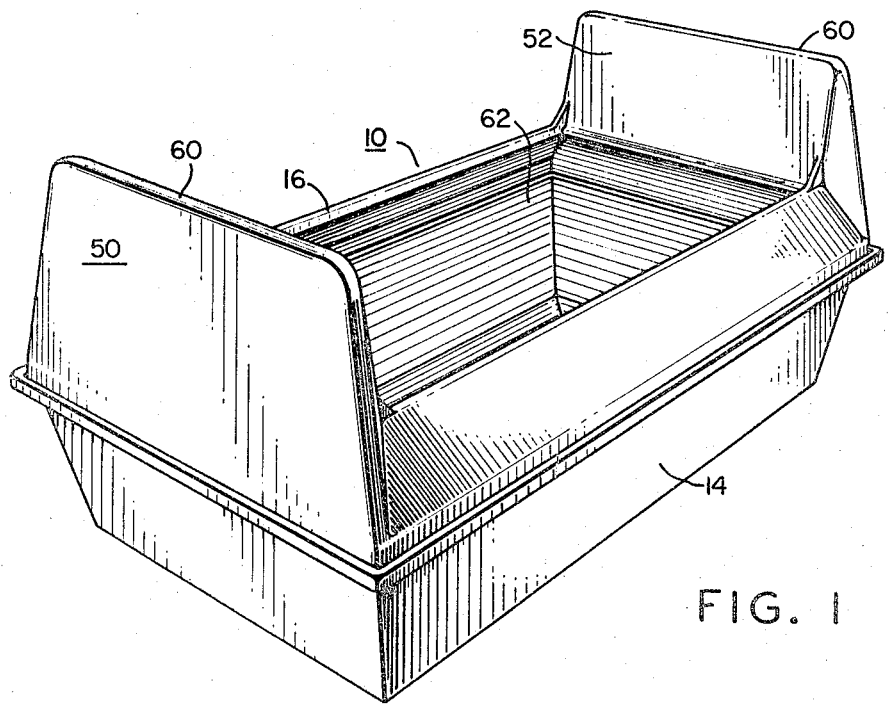
FIGURE 1 is a perspective view of the present cat box showing the parts in their proper assembled relationship.
Figure 6:
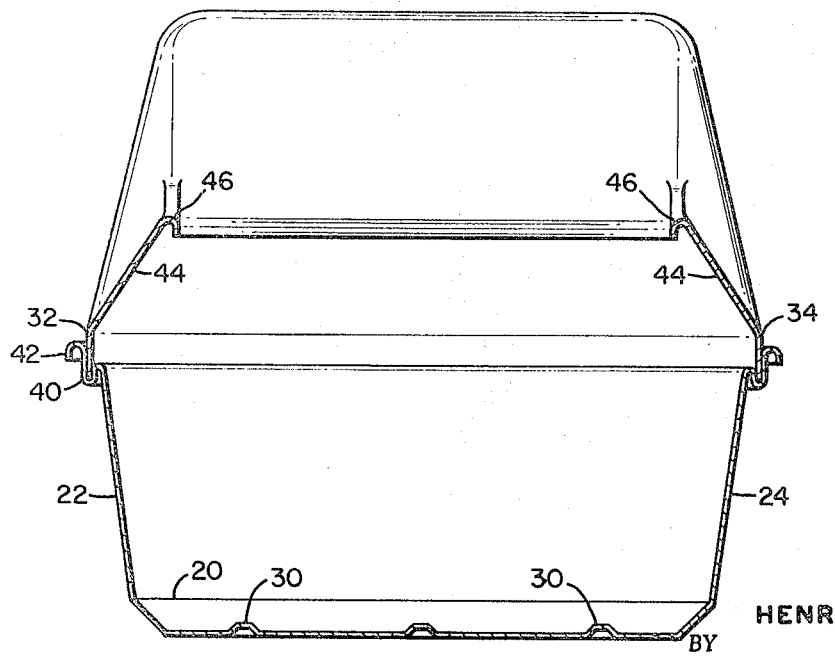
FIGURE 6 is a vertical cross sectional view of the present cat box, the section being taken on line 6—6 of FIGURE 3.
Figure 3:
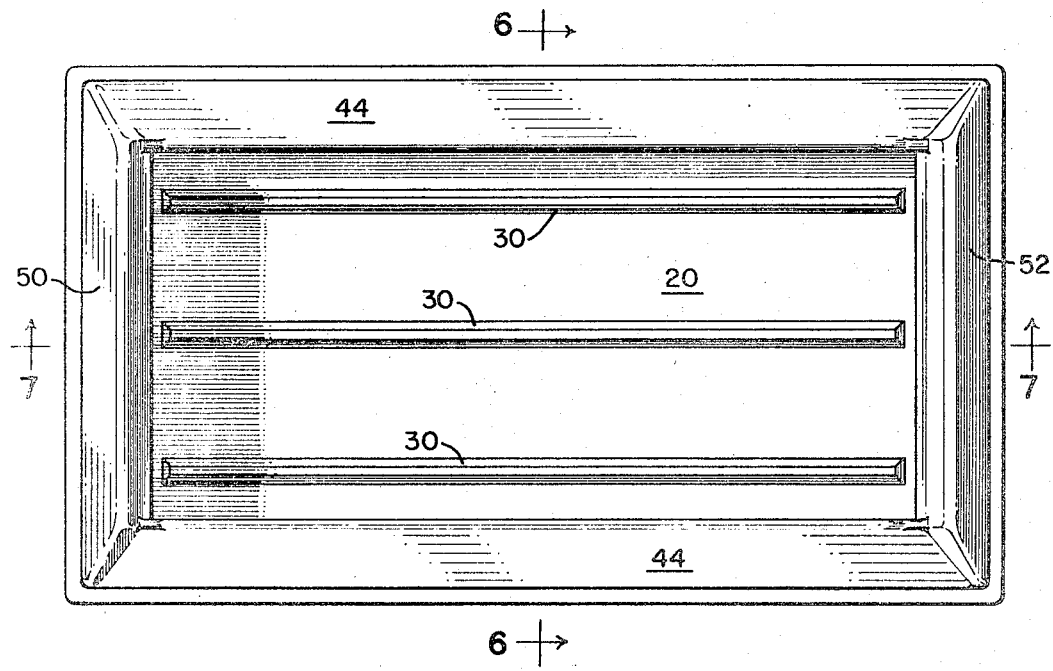
FIGURE 3 is a top plan view of the box shown in the preceding figures.
Figure 2:
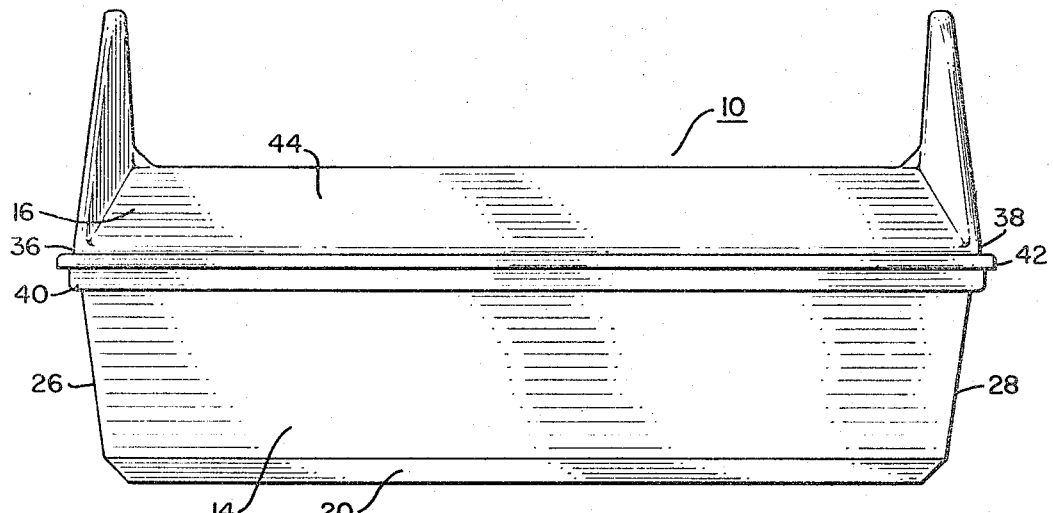
FIGURE 2 is a side elevational view of the present cat box.
Figure 5:
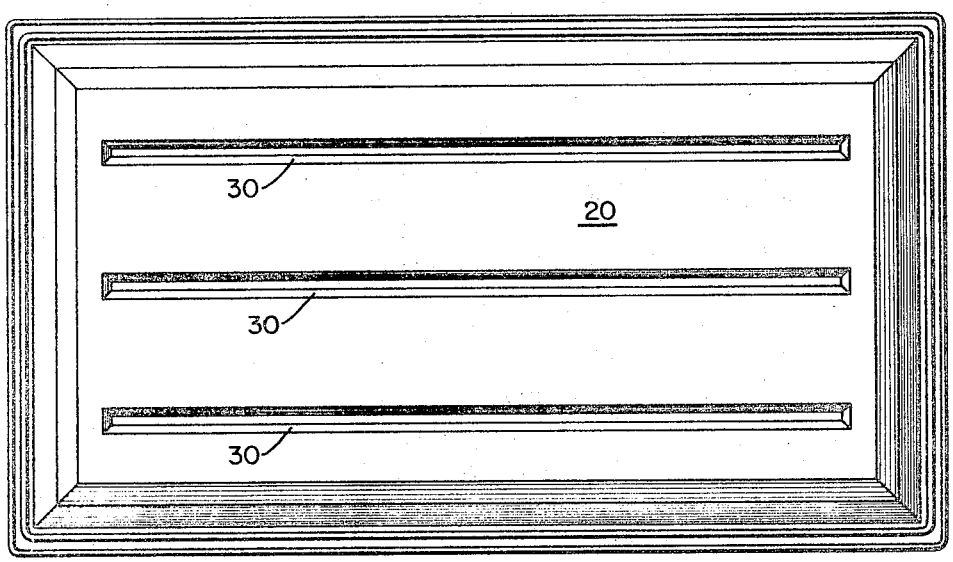
FIGURE 5 is an elevational view of the bottom.
Figure 4:
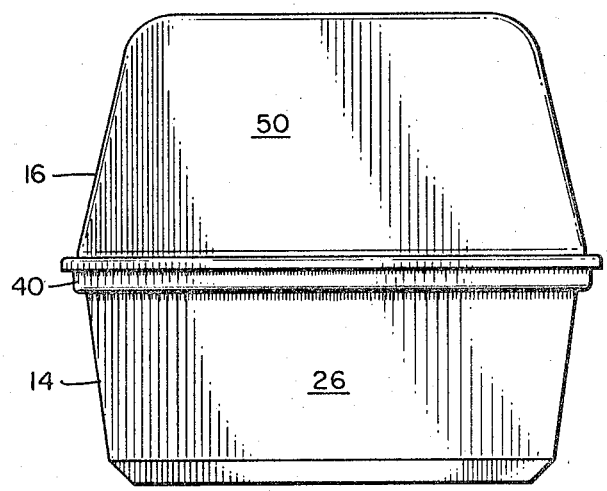
FIGURE 4 is an end elevational view of the box.

Referring more specifically to the drawings, numeral 10 designates generally the present sanitary cat box having a generally rectangularly shaped pan or container portion 14 for holding the filler material and a cat orienting and material retaining structure 16 mounted on the pan. These two principal portions of the present cat pan may be of somewhat different shapes and sizes, but the configuration shown in the drawings has been found most satisfactory. These two portions may also be made of a variety of materials, such as plastic, metal or any other suitable material, preferably of a material which can be easily cleaned and handled for emptying the used filler material and reassembling for further use.

The pan shown in the drawings consists of a bottom 20 having two upwardly extending sides 22 and 24 connected integrally with the bottom, and two ends 26 and 28 connected integrally with the bottom and the two sides, thus forming a liquid and moisture containing structure. Bottom 20 preferably contains a plurality of strengthening ribs 30 extending substantially the full length thereof. The shape of the sidewalls and bottom are intended to facilitate cleaning when the orienting structure 16 has been removed therefrom.

The cat orienting and material retaining structure 16 is mounted directly on top of pan 14 and is substantially the same size, with the lower edges of sides 32 and 34 and ends 36 and 38 seating in a U-shaped groove structure 40 attached to the upper edge of the sides and ends of the edge of the pan, and extending completely around the periphery thereof. The outside edge 42 of structure 40 extends somewhat above the upper edge of the sides in order to facilitate assembling the cat orienting structure on the pan, and the upper edge is rolled over to provide a smooth surface.

The walls 32 and 34 of the cat orienting structure contain two inwardly and angularly extending side portions 44 which form effective baffles to prevent the filler material in the pan from being thrown or scattered therefrom when the cat is scratching or digging preparatory to using the pan. The upper edge 46 of each side is rolled or curved inwardly to provide a smooth surface over which the cat can readily climb without injuring himself. Secured to and extending upwardly at the two ends are restraining members or panels 50 and 52 joined integrally to the two sides 32 and 34 and portions 36 and 38, and projecting upwardly therefrom to a substantial height thereabove. The two restraining panels incline inwardly from the outer edge of the pan, and in the embodiment of the invention illustrated in the drawings, each consists of an outer wall 54 and an inner wall 56 with the lower edge 58 of inner wall 56 being positioned above but inwardly from the upper edge of pan walls 26 and 28. The restraining member or panel could be constructed of a single wall structure rather than the double wall structure as illustrated. The upper edge 60 of each restraining member is preferably relatively broad and extends substantially the full width of the opening 62 between the inner edges of inwardly slanting portions 44 of the two sides 32 and 34.

The distance between the two side walls 32 and 34 at the upper edges thereof at beads 46 is sufficiently small to prevent the cat from functioning effectively with the body crosswise of opening 62. However, the length of the opening between the two restraining end panels 50 and 52 is sufficient to permit the cat to dig comfortably, and naturally dig the normal hole and to properly position himself when he is using the box. This elongated hole arrangement, together with the upwardly extending panels, effectively orients the cat within the opening so that the waste is discharged on the filler material within the pan, spaced well from the outside walls of the pan and orienting structure.

In the operation and use of the present sanitary cat box, a filler material of rather loose texture is placed in the pan somewhere below the upper edge thereof, covering the entire bottom and extending upwardly along the sides to a point near the top, but spaced downwardly therefrom. The cat orienting structure 16 is then placed on the pan 14 with the lower edges of the structure seated firmly in groove 40. The box filled and assembled in the foregoing manner is then placed in a convenient location for the cat. When the cat desires to use the box, he climbs or steps into the elongated opening 62, which is too narrow for the cat to maneuver effectively crosswise in the box, but adequately long to permit him to perform the scratching and discharge function. Consequently, the cat inherently and naturally places himself lengthwise in opening 62, with his tail toward one restraining member 50 or 52 and his head toward the other. After the hole has been dug in the normal manner, the cat then positions himself over the hole, again with his head facing one restraining member and his tail pointing toward the other. The restraining members, being rather tall, prevent the cat from backing over or near the edge of the ends of the box, and hence restrain his movement to a position well within the container and above the filler material. After the cat has used the pan, he then covers the waste in the normal manner and leaves the box.

When it is desired to clean the present sanitary cat box, the orienting structure 16 is lifted from the pan and the loose material containing the waste is emptied from pan 14, which is then suitably cleaned, the pan properly refilled with clean loose material and the cat orienting structure reassembled on the pan ready for further use by the cat.

While only one embodiment of the invention has been described in detail herein, various changes and modifications may be made without departing from the scope of the invention.

I claim:

1. A sanitary cat box comprising a generally rectangularly shaped elongated pan for filler material having walls forming on open top and having an upwardly facing groove around the upper edge thereof and a plurality of ribs in the bottom, a cat orienting structure removably mounted on the upper edge of said pan with the lower edge of said structure seated in said groove, said structure being substantially the same size and shape at its lower edge as the upper edge of said pan and including side walls extending upwardly and inwardly and forming a restricted elongated opening, and a restraining panel with an inwardly facing side at each end of said structure connected to the side walls of said structure and projecting substantially above said side walls and extending substantially across the end of said orienting structure, the inner side of said restraining panels being positioned directly above the open top of said pan.

2. A sanitary cat box comprising a generally rectangularly shaped elongated pan for filler material having walls forming on open top and having an upwardly facing groove around the upper edge thereof, a cat orienting structure mounted on the upper edge of said pan with the lower edge of said structure seated in said groove, said structure including side walls extending upwardly and inwardly and forming an elongated opening, and a restraining panel with an inwardly facing side at each end of said structure connected to the side walls of said structure and projecting substantially above said side walls and extending substantially across the end of said elongated opening, the inner side of said restraining panels being positioned directly above the open top of said pan.

References Cited by the Examiner
UNITED STATES PATENTS

| 2,144,329 | 1/1939 | Conlon et al. | 119—1 |
| 2,741,223 | 4/1956 | Winborn | 119—1 |
| 3,085,550 | 4/1963 | Crawford | 119—1 |

SAMUEL KOREN, *Primary Examiner.*

HUGH R. CHAMBLEE, *Examiner.*